United States Patent Office 2,947,766
Patented Aug. 2, 1960

2,947,766

ACYLOXY-HALO DERIVATIVES OF ALIPHATIC ACIDS AND THEIR ESTERS

Edward F. Riener, Philadelphia, Pa., assignor to Rohm & Haas Company, Philadelphia, Pa., a corporation of Delaware No Drawing. Filed Apr. 16, 1954, Ser. No. 423,846

8 Claims. (Cl. 260—405)

This invention relates to acids which contain 16 to 22 carbon atoms and which also contain, in the aliphatic chain, at least one acyloxy-halo group of the formula

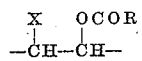

wherein X is an atom of chlorine or bromine and R is a lower alkyl group. It also relates to the esters of these acyloxy-halo substituted acids. More particularly it relates to acyloxy-halo stearic acid and the alkyl esters thereof having the

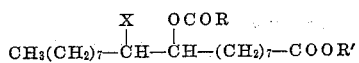

in which R is a hydrogen atom or a lower alkyl group—preferably a methyl or ethyl group—R' represents a monovalent hydrocarbon radical containing 1 to 14 carbon atoms, and X represents an atom of chlorine or bromine. The invention also relates to the structural or geometrical isomers of the above substituted acids and esters. The products of this invention are themselves useful as secondary plasticizers for such plastic materials as the vinyl halide resins. They are, furthermore, particularly valuable because they can be converted into a wide variety of derivatives which have great utility. For example, the acyloxy-halo acids are readily converted to the dihydroxy acids by means of dilute aqueous caustic; and the dihydroxy acids, in turn, may be esterified and then reacted with phosgene and thus converted to carbonate esters. These last are especially useful as plasticizers for vinyl halide resins. Alternatively, the acyloxy-halo compounds may be fused with caustic and thereby converted into mono-basic and poly-basic carboxylic acids, for which currently there is great demand. The acyloxy-halo esters of this invention may be converted by means of alcoholic potassium hydroxide into the corresponding epoxy esters which, as is well-known, are employed in tremendous volumes as plasticizers and stabilizers for vinyl halide resins.

The products of this invention all contain the acyloxy-halo group shown above, wherein R represents a hydrogen atom or a lower alkyl group, preferably the methyl or ethyl group. They are made by reacting an unsaturated acid or ester thereof with a tertiary alkyl hypochlorite or hypobromite, preferably tertiary-butyl hypochlorite, and an aliphatic acid such as formic, acetic, propionic, and the like, according to the process described in U.S. Patent 2,054,814. The use of formic and acetic acids which give rise to formoxy-halo and acetoxy-halo derivatives is much preferred for reasons of economy and efficiency. The reaction of the unsaturated acid or ester with the organic acid and with the tertiary alkyl hypohalite can be carried out at a temperature from about 0° C. up to the boiling point of the reaction mixture In commercial operation, an intermediate temperature of the order of about 20° C. to about 60° C. is, however, preferred. In the preferred procedure the tertiary alkyl hypohalite is added at such a rate that the temperature is held below that at which the hypohalite would be lost by vaporiziation. Also the use of a solvent such as t-butanol, benzene or toluene is recommended.

The acids which are thus converted to the acyloxy-halo derivatives of this invention are those which contain 16 to 22 carbon atoms and which also contain one or more double bonds. Typical of such acids are oleic acid, erucic acid, elaeostearic acid, linoleic acid, linolenic acid, clupanodonic acid, palmitoleic acid and palmitolenic acid. All of these acids occur in animal or vegetable oils, for example, in soybean, rapeseed, linseed, sardine and whale oils and are readily obtained by the saponification of the naturally occurring oils. The esters of the fatty acids which are converted by the process of this invention to acyloxy-halo esters are those of monohydric and polyhydric alcohols typified by the following: mono-, di-, and tri-substituted carbinols, such as ethyl, isopropyl, n-butyl, sec-butyl, tert-butyl, tert-amyl, n-octyl, 2-ethylhexyl, octadecyl, lauryl, cyclohexyl and benzyl alcohol; polyhydric alcohols, such as ethylene glycol, 1,2-propylene glycol, 2-ethylhexandiol-1,3, butandiol-1,2, butandiol-1,3, butandiol-1,4, dodecandiol-1,12, polyalkylene glycols such as diethylene glycol; glycerol; pentaerythritol; and the isomers and homologues of the above. This invention also embraces mixed esters such as ethylene oleate-linoleate glyceryl di-oleate-monolinoleate; butylene linoleate-oleate, and the like. The naturally occurring vegetable and animal oils likewise give rise to the acyloxy-halo esters of this invention. These oils are mixed esters of glycerol and a mixture of the acids mentioned above, and include the following: soybean, corn, cottonseed, safflower, sunflower, sesame, poppyseed, walnut, peanut, linseed sardine perilla and fish oils in general. Since all of these esters contain aliphatic unsaturation, they can readily be converted to products containing the halo and the acyloxy substituents.

It should be noted that mixtures of isomeric compounds are ordinarily formed, since it is virtually impossible to regulate the reaction so that the halo and acyloxy substituents always become attached to the same carbon atoms adjacent to the double bonds.

The following examples describe the preparation of the acyloxy-halo compounds of this invention. The examples cover the preparation of formoxy-chloro and acetoxy-chloro derivatives of an acid, of alkyl esters of an acid and of a vegetable oil, the last representing an ester of a polyhydric alcohol. The bromo derivatives are prepared by merely substituting an equivalent amount of a tertiary-alkyl hypobromite for the tert-butyl hypochlorite in the examples. Since the alcohol moieties in the esters remain intact under the conditions described herein and since all of the products are oils, the various esters are prepared by the same procedure as is described in the following examples.

Example 1

A mixture of 141.3 grams (0.5 mole) of oleic acid, 300 milliliters of 100% formic acid and 1 gram of p-toluenesulphonic acid was charged to a reactor equipped with thermometer, agitator, and reflux condenser. The mixture was cooled to 12° C. and was stirred and maintained at 12° to 16° C. while 60 grams (0.55 moles) of tert-butyl hypochlorite was added over a period of about an hour. The cooling means was removed and the temperature of the stirred mixture was allowed to rise to about 30° C. Thereafter, the reaction solution was stirred at ambient temperature for 17 hours. The solution was poured into a liter of water and the organic phase was extracted with a liter of benzene. The benzene solution was washed thoroughly with water after which the benzene was stripped off. A total of 179 grams (theoretical yield=181.5 grams) of a mixture of 9,10- and 10,9-formoxychlorostearic acid was obtained. It was a straw-colored oil having an index of refraction ($n_D^{20}$) of 1.4690. Its composition was confirmed by analysis: Iodine number: theory 0, analysis 0.1; acid number: theory=154, analysis=145; saponification number: theory=464, analysis=430.

*Example 2*

The procedure of Example 1 was followed. Thus a mixture of 183.3 grams (0.5 mole) of n-hexyl oleate, 46 grams (1.0 mole) 98% formic acid, and 0.5 gram of p-toluenesulphonic acid was stirred and cooled to 10°–15° C. while 60 grams (0.55 mole) of tert-butylhypochlorite was added dropwise over a period of about an hour. The solution was stirred at room temperature for 17 hours after which it was worked-up by the method described in Example 1. A total of 220 grams of a pale oil was obtained which had an index of refraction of 1.4590. Its analysis corresponded very closely to that of a mixture of n-hexyl 9,10- and 10,9-formoxychlorostearate.

*Example 3*

A mixture of 94 grams (0.5 mole based on double bond content) of soybean oil, 200 milliliters of 98% formic acid and 0.5 gram of p-toluenesulphonic acid was stirred and cooled at 10°–15° C. while 60 grams (0.55 mole) of tert-butyl hypochlorite was added over a period of about 45 minutes. The cooling means was removed and the mixture was then stirred to room temperature for 19 hours. It was extracted and purified as described in Example 1. The product, 127.5 grams of poly(formoxychloro)soybean oil, had an index of refraction ($n_D^{20}$) of 1.4802. Its chlorine-content was found to be 13.1% as against a theoretical value of 13.2%.

*Example 4*

A mixture of the n-hexyl esters of 9,10- and 10,9-acetoxychlorostearic acids was made by the general procedure described above. Thus a mixture of 146.6 grams (0.4 mole) of n-hexyl oleate, 300 grams (5 moles) of glacial acetic acid and 1 gram of p-toluenesulphonic acid was stirred at 15°–20° C. while to its was added dropwise over a period of about 30 minutes 47.7 grams (0.44 mole) of tert-butylhypochlorite. The solution was stirred at 10°–20° C. for two hours after which the temperature was allowed to rise and the solution was stirred at room temperature for 16 hours. The product was worked-up in the manner described above and a total of 188 grams of a pale oil was obtained. It was a mixture of n-hexyl 9,10-acetoxychlorostearate and n-hexyl 10,9-acetoxychlorostearate, as confirmed by analysis. Its index of refraction was $n_D^{20}=1.4595$.

*Example 5*

The procedure of Example 3 was followed in preparing poly(acetoxychloro)soybean oil. To a mixture of 376 grams (2 moles based on one double bond) of soybean oil, 400 milliliters of glacial acetic acid, 2 grams of p-toluenesulphonic acid, and 240 grams of tert-butyl alcohol was slowly added 240 grams of tert-butyl hypochlorite. The reaction mixture was stirred at room temperature for 17 hours. The product was isolated in the customary way and 554 grams of poly(acetoxychloro)-soybean oil was obtained. Its index of refraction was $n_D^{20}=1.4774$ and its composition was confirmed by analysis.

I claim:

1. As composition of matter a compound selected from the class consisting of 1) saturated fatty acids containing 16 to 22 carbon atoms and having at least one acyloxyhalo group of the formula

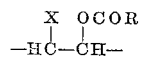

wherein X is a halogen atom from the class consisting of chlorine and bromine, and R is a member of the class consisting of a hydrogen atom and a methyl group, and 2) acyloxyhalo substituted esters of the said saturated fatty acids, the alcohol moiety of said esters being selected from the group consisting of monohydric unsubstituted alkanols containing from 1 to 18 carbon atoms, benzyl alcohol and cyclohexyl alcohol, unsustituted alkane diols containing from 2 to 12 carbon atoms, polyalkylene glycol, glycerol, and pentaerythritol.

2. As composition of matter acyloxyhalo-substituted alkyl esters, the acid moiety thereof being an fatty acid containing 16 to 22 carbon atoms and the alcohol moiety thereof being an alkanol containing from 1 to 18 carbon atoms, said ester containing in the acid moiety the group

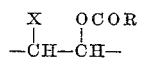

in which X is a halogen from the class consisting of chlorine and bromine, and R is a member of the class consisting of a hydrogen atom and a methyl group.

3. As composition of matter acyloxyhalo-substituted glyceridic esters of a saturated fatty acid containing 16 to 22 carbon atoms, said esters containing in the acid moieties thereof the group

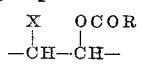

in which X is a halogen from the class consisting of chlorine and bromine, and R is a member of the class consisting of a hydrogen atom and a methyl group.

4. As composition of matter formoxychloro-substituted stearic acid which contains the group

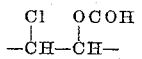

in the 9-position and in the 10-position of the chain of the acid.

5. As composition of matter a hexyl ester of formoxychloro-substituted stearic acid which contains the group

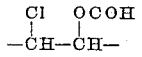

in the 9-position and in the 10-position of the acid moiety of said ester.

6. As composition of matter a hexyl ester of acetoxychloro-substituted stearic acid which contains the group

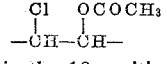

in the 9-position and in the 10-position of the acid moiety of said ester.

7. A composition of matter as defined in claim 3 wherein the glyceridic ester is derived from soybean oil, X is chlorine, and R is hydrogen.

8. A composition of matter as defined in claim 3 wherein the glyceridic ester is derived from soybean oil, X is chlorine, and R is methyl.

References Cited in the file of this patent

UNITED STATES PATENTS

| | | |
|---|---|---|
| 2,054,814 | Harford | Sept. 22, 1936 |
| 2,557,159 | Teeter et al. | June 19, 1951 |

OTHER REFERENCES

King: J. Chem. Soc. (London) 1949, 1817–1823.